United States Patent [19]

Hansen et al.

[11] 4,057,137

[45] Nov. 8, 1977

[54] METHOD AND APPARATUS FOR FEEDING ARTICLES ONTO A MOVING CONVEYOR

[75] Inventors: Clarence M. Hansen, East Lansing; Richard L. Ledebuhr, Haslett, both of Mich.

[73] Assignee: Dura Corporation, Southfield, Mich.

[21] Appl. No.: 644,501

[22] Filed: Dec. 29, 1975

[51] Int. Cl.² ............................................. B65G 29/00
[52] U.S. Cl. .................................. 198/443; 198/397; 198/481; 198/803; 221/237
[58] Field of Search ................... 198/25, 30, 103, 209, 198/210, 211, 212, 392, 393, 397, 443, 803, 479, 480, 481; 214/1 BD; 221/219, 236, 237

[56] References Cited

U.S. PATENT DOCUMENTS

| 951,412 | 10/1908 | Baltzer | 221/237 |
|---|---|---|---|
| 1,698,477 | 1/1929 | Frova | 198/210 |
| 1,932,529 | 10/1933 | Nagy | 198/392 |
| 2,180,647 | 11/1939 | Steinbiss | 198/209 X |
| 2,482,916 | 9/1949 | Kane | 198/103 |
| 2,622,719 | 12/1952 | Amori | 198/103 |
| 2,644,568 | 7/1953 | Wells | 198/211 X |
| 3,026,003 | 3/1962 | Edels et al. | 221/237 X |
| 3,342,314 | 9/1967 | Holbrook | 198/30 X |
| 3,887,062 | 6/1975 | Bushman | 198/52 |

FOREIGN PATENT DOCUMENTS 1,163,239   2/1961   Germany .................. 198/103

Primary Examiner—Evon C. Blunk
Assistant Examiner—Richard K. Thomson
Attorney, Agent, or Firm—Hill, Gross, Simpson, Van Santen, Steadman, Chiara & Simpson

[57] ABSTRACT

A high capacity device for reliably sorting pieces of fruit from a bulk supply into individual cups for processing. The fruit is received in bulk in a hopper, a side of which is open to a center hub of a connected pair of feed wheels revolving coaxially in spaced horizontal relation. Each feed wheel carries a plurality of radially-extending through passages about its periphery. Each passage carries at least two individual pieces of said fruit simultaneously. An outward, exit end of each passage is normally blocked by cammable gate fingers. The feed wheels are rotatably synchronized with a pair of chains engaged with sprockets attached to the feed wheels and carrying therebetween a conveyor carrying the fruit cups. The speed of revolution of the feed wheels is sufficient to keep an outermost one of the fruit pieces lodged adjacent the gate fingers. Fixed camming surfaces open the gate fingers of each feed passage at a tangential engagement point between the wheel sprockets and the drive chain of the conveyor, thereby to place the outermost fruit from each passage gently into the receiving cup.

6 Claims, 5 Drawing Figures

METHOD AND APPARATUS FOR FEEDING ARTICLES ONTO A MOVING CONVEYOR

BACKGROUND OF THE INVENTION

1. Field of the Invention

This invention relates generally to a method and apparatus for synchronously depositing articles onto a moving conveyor, and more particularly to a method and apparatus for feeding unpitted drupaceous fruit, such as cherries, from a feed hopper onto a continuously moving conveyor which conveys the unpitted fruit to a pitting station.

The disclosed apparatus was particularly, although not exclusively developed for feeding individual pieces of drupaceous fruit, such as cherries, prunes, plums, olives and the like, into spaced fruit-receiving receptacles mounted on a continuously moving conveyor for further processing, such as pitting. It will be understood, however, that the method and apparatus of the present invention may be effectively utilized in many other applications requiring the feeding of discrete articles from bulk onto spaced locations on a continuously moving conveyor without relative motion therebetween. For ease of description, the articles fed will be referred to as cherries, for which the apparatus was designed.

2. Description of the Prior Art

The prior art teaches many types of fruit pitting machines. Intermittently operated machines have proven relatively slow and are subject to vibration and mechanical failure. The more modern pitting machines generally operate continuously and many such machines employ continuously moving conveyors having spaced friot-receiving or fruit-supporting cups mounted thereon. These cups transport the individual fruits to a pitting station where the pit is removed by forcing a needle-like knife or punch through the fruit to push the pit out the other side. The cup is then moved on and the fruit is dumped or emptied into a hopper with other pitted fruit leaving the conveyor and empty cups free to return to receive another unpitted fruit to be taken to the pitting station. Such conveyor systems are shown in U.S. Pat. Nos. 2,243,246; 2,406,311 and 2,635,662.

The prior art also teaches many different methods for feeding or depositing the individual fruit from a feed hopper into the fruit-supporting cups of the conveyor. The above-referenced patents teach various methods for feeding fruits into the cups, and additionally, U.S. Pat. Nos. 2,360,412; 2,413,861; 2,759,509; and 3,212,545 teach various other examples of feed mechanisms for supplying the unpitted fruit from a central hopper or supply into the fruit-receiving or supporting cups of a moving conveyor.

Some of these systems may prove adequate for intermittently fed conveyors or for conveyors which move relatively slowly. This type of feed system however limits the overall speed of operation of the pitting machine since it can operate no faster than cherries are fed to the pitting station. Additionally, as the speed of the conveyor is increased, the cherries tend to roll or hop out of the fruit-receiving cups and fall into the interior of the machine and possibly into the pitted fruit bin. Some of the types of hoppers cited above tend to bruise or damage the appearance of the fruit through abrasion and pinching as the conveyors and feed mechanisms are accelerated. Furthermore, mis-feeds will occur in which no unpitted fruit is supplied to the conveyor and this lessens the efficiency of the overall pitting operation.

The present invention sychronizes the speed of the cherry in the direction of motion of the continuously moving conveyor so that there is no relative motion between the two, thereby insuring that the cherries fed into the fruit-receiving cups remain therein. Furthermore, the present invention accomplishes this at a much higher rate of speed than was previously thought possible without damaging the texture or appearance of the fruit.

BRIEF SUMMARY OF THE INVENTION

The present invention provides a rotary feed wheel having a centrally hollow interior hub portion, a plurality of circumferentially-spaced exit ports about the periphery of the wheel, and a corresponding plurality of outwardly-extending radially-oriented feed passages to supply articles such as cherries from the hollow central hub portion to the peripheral exit ports.

Articles, such as unpitted cherries, are fed into the hollow central hub portion and tumbled by the rotation of the wheel into one or more of the radially extending passages. As a succession of cherries enters a given feed passage, they are moved outwardly in the passage and toward the exit port by the combined operation of gravity and centrifugal force. The cherry at the peripheral or outer radial end of the succession is positively gripped or releaseably retained within the passage adjacent the exit port while the wheel rotates, and others of the cherries in the succession are maintained toward the peripheral end of the passage by the centrifugal force generated by the rotation of the wheel. As one of the passages approaches an operable position substantially vertically above the spaced location on a continuously moving conveyor, and when the component of the velocity of the releaseably retained end cherry is synchronized to the velocity of the continuously moving conveyor, the end cherry will be released, dropped through the exit port and deposited at the predetermined spaced location on the conveyor.

Since the speeds have been synchronized by the operation of the rotary feed wheel, there will be no relative motion between the deposited cherry and the conveyor, thereby preventing hopping or loss of the cherry from the conveyor. Furthermore, as soon as the end cherry has been released, the succession of cherries remaining in the passage will be moved toward the exit port at least partially by centrifugal force and the newly positioned end cherry will be held until the next deposit cycle. This rotary feed wheel can operate at much higher speeds than were heretofore possible since synchronization is easily obtained. Furthermore, there is no delay in moving cherries to the feed position on the feed wheel since centrifugal force insures that the next successive cherry is always in position. There is, therefore, no need to wait for subsequent cherries to tumble through the radial passages from the hollow central portion since centrifugal force maintains at least one or more of these cherries within the passages at all time throughout the rotation of the wheel. The width of the passages and the shape of the blocking elements can be chosen to as to minimize damage to the cherries.

These and other objects and advantages of the present invention will become more readily apparent upon reading the following specification which describes an illustrative embodiment of the present invention, along with the accompanying claims and the drawings, a description of which follows.

DESCRIPTION OF THE PREFERRED EMBODIMENT

Figure 1:
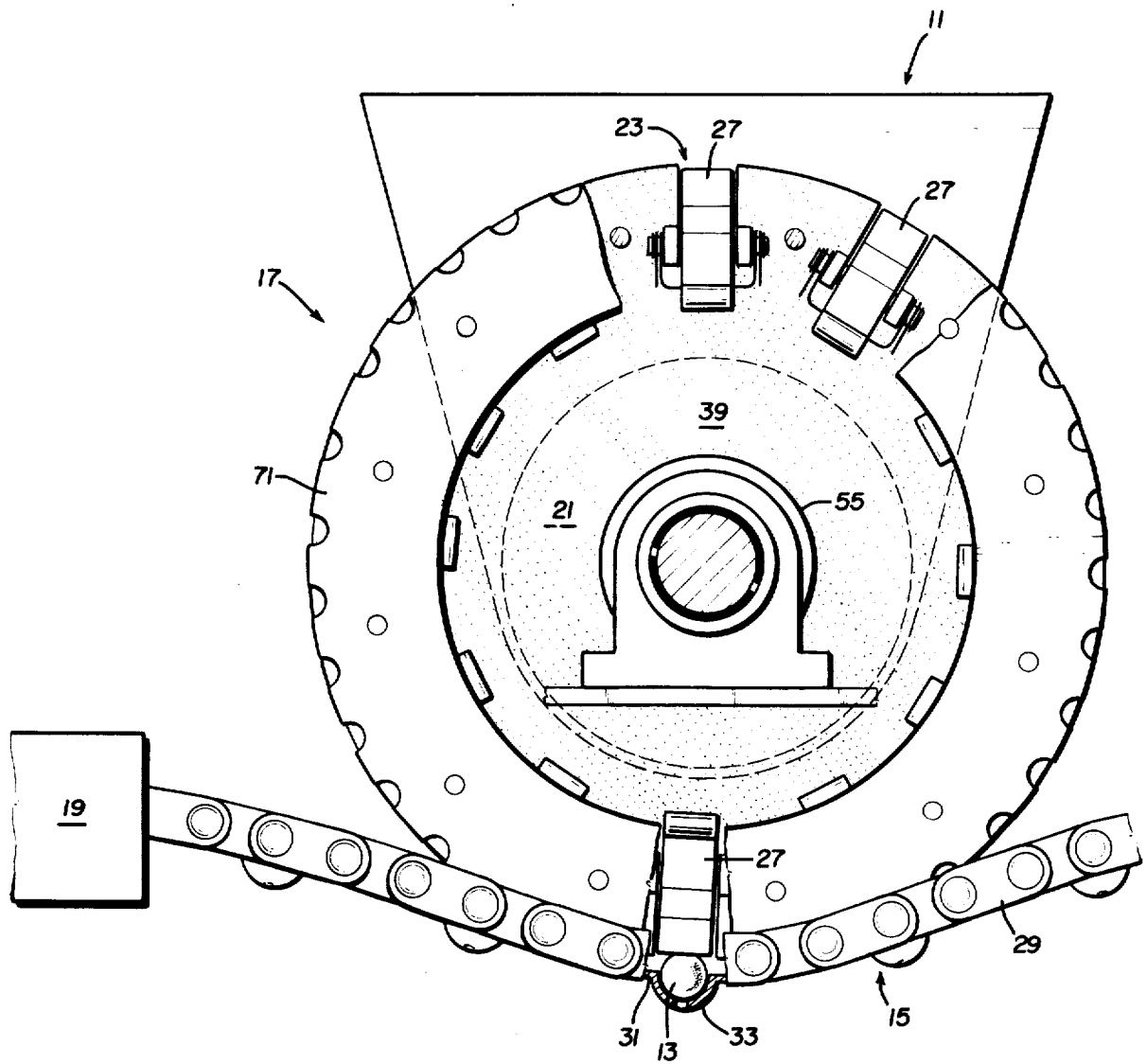
FIG. 1 is a view, partly in elevation, partly in schematic, and partly in section showing a rotary feed wheel embodying the present invention being used in a fruit pitting system for feeding pieces of fruit, such as cherries, onto a continuously moving conveyor system which carries the cherries to a pitting station.

FIG. 1 illustrates the rotary feed wheel of the present invention being utilized in a system of removing the pits from drupaceous fruit, such as cherries, apricots, plums, prunes, olives and the like. A supply hopper 11 receives a supply of cherries 13, which are to be deposited onto a continuously moving conveyor 15 by a rotary feed wheel 17. The continuously moving conveyor 15 then transports the cherries 13 deposited thereon to a pitting station 19 wherein the pits are removed, as known in the art. The details of the pitting station 19 and of the specific construction of the conveyor 15 are not essential to an understanding of the present invention and may be any of those taught in the following U.S. Pat. Nos.: U.S. Pat. No. 2,243,246 which issued on May 17, 1941 to E. W. Carroll for a Pitting Machine; U.S. Pat. No. 2,406,311 which issued on Oct. 27, 1946 to G. W. Ashlock, Jr. for Article Orientation; and U.S. Pat. No. 2,635,662 which issued on Apr. 21, 1953 to W. A. Doering et al for a Fruit Transport Device for Pitting Machines; and each of these United States Patents is incorporated by reference herein to teach various conveyors and pitters useful with the present invention.

The cherries are fed into the supply hopper 11 which resides behind the feed wheel assembly 17 in FIG. 1 and then conveyed by gravity into the centrally hollow interior hub portion 21 of the feed wheel assembly 17. A plurality of circumferentially spaced exit ports 23 are provided about the periphery of the feed wheel assembly 17 and are connected to the centrally hollow tub portion 21 by a corresponding plurality of tubular radial feed passages 25.

As the feed wheel assembly 17 is rotated and cherries 13 are fed or introduced into the centrally hollow hub portion 21 from the feed hopper 11, the cherries 13 are tumbled and directed or inserted into one or more of the plurality of feed passages 25 by gravity or centrifugal force or both. The rotation of the feed wheel assembly 17 centrifugally moves the succession of cherries 13 which was directed into the passages 25 outwardly toward the exit ports 23 but the cherries do not pass therethrough due to the blocking or gating assemblies 27 which are located at the outer radial or peripheral end of the passages 25. These gating elements 27 close the exit ports 23 to prevent the cherries 13 from passing therethrough. The distal peripheral end article in the succession of cherries contained within a given passage 25 is held against the gating elements 27 by the gating element 27 itself or by centrifugal force or both. Others in the succession of cherries are retained outwardly in the passage 25 and proximate the end cherry 13 by the centrifugal force generated by the rotation of the feed wheel assembly 17. When one of the passages 25 rotates to where the exit port 23 is operatively positioned above a predetermined location on the convey 15, and when the component of velocity of the end cherry in the direction of motion of the conveyor15 is synchronized with the speed of the conveyor 15, then the gating elements 27 will open to deposit the end cherry 13 into one of the fruit-receiving cups 33 of the conveyor 15. The cherry 13 will not jump or hop out of the cup 33 since their speeds have been synchronized.

The conveyor 15 may, for example, include parallel sets of conveyor chains each including a plurality of sprocket links 29, 30. Alternating sprocket links 29, 30 may carry a plate 31 therebetween and a plurality, two in the preferred embodiment of the present invention, of fruit-supporting or receiving cups 33 may be provided in each of the plates 31. As known in the art, the bottom of each of the fruit-supporting cups 33 may be perforated or have a flexible bottom (see FIG. 2) through which the pitting tool may extend to remove the pit.

Figure 2:
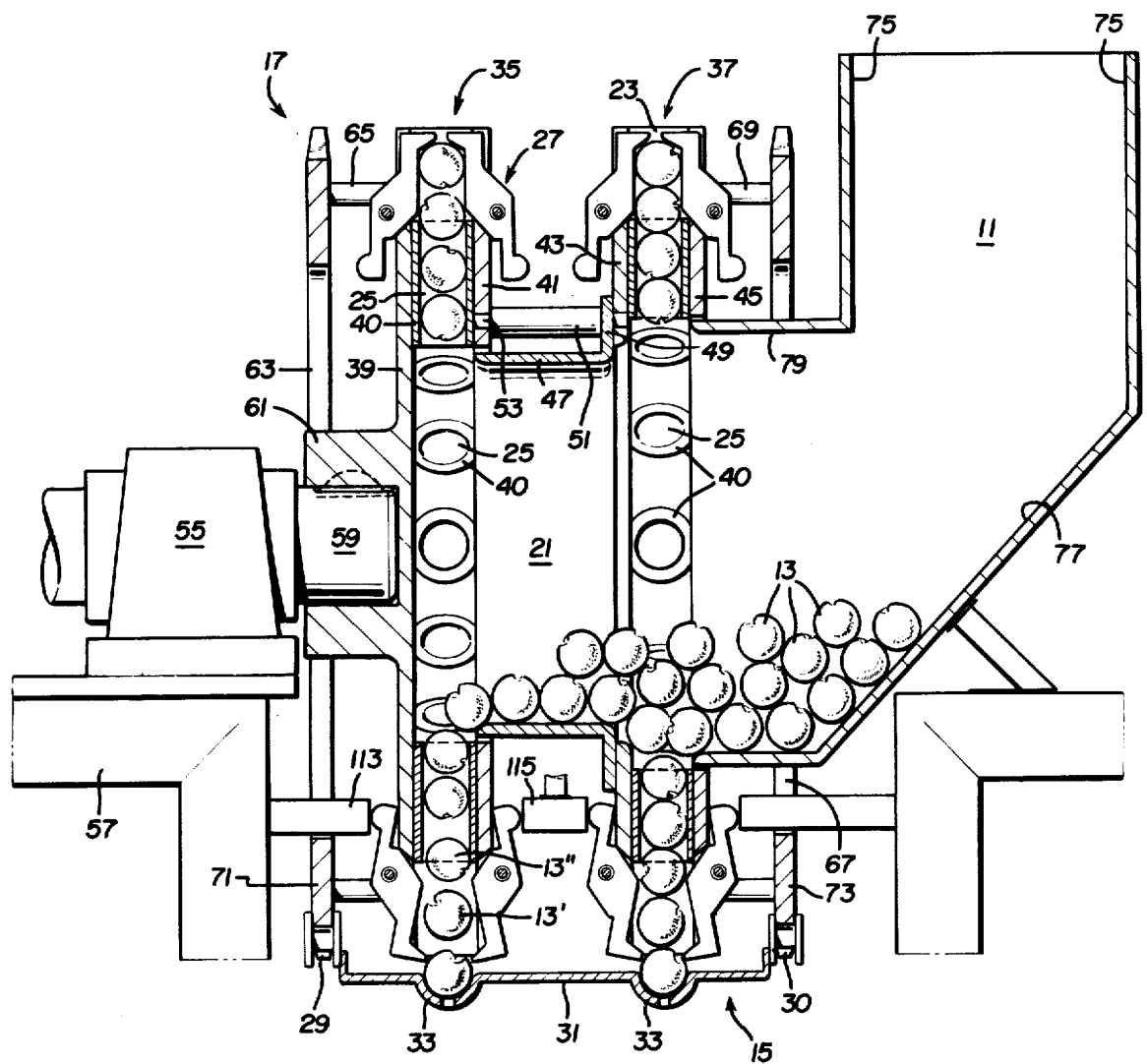
FIG. 2 is a sectional view taken along view lines 2—2 of FIG. 1.

FIG. 2 shows the rotary feed wheel assembly 17 of the present invention as including a first rotary feed wheel 35 and a second rotary feed wheel 37. The outside circular wall 39 of the first rotary feed wheel 35 defines one said wall of the plurality of radially extending feed passages 25. The opposite side wall of the first rotary feed wheel 35 and both side walls 43, 45 of the second rotary feed wheel 37 are planar disc-like members having a central aperture corresponding to the diameter of the centrally hollow hub portion 21. In the preferred embodiment, the feed wheels 35 and 37 are integrally cast and the passages 25 are spoke-like radially-oriented members 40 having a substantially cylindrical shape. Hence, the pair of walls 39, 41 and the pair of walls 43, 45 are actually disc-like sides of the wheels 35, 37, each pair having a plurality of radially extending tubular spoke-like members 40 forming the cylindrical passages. The wall portion of the centrally hollow hub portion 21 includes a hollow cylindrical member 47 having an extending flange 49 about one end thereof. The feed wheels 35 and 37 are separated from one another by a separating sleeve 51 which is positioned between the interior side wall 41 of the first feed wheel 35 and the flanged lip 49 of the hollow cylindrical member 47 which abuts the side wall 43 of the second rotary feed wheel 37. A bolt means or the like 53 passes through the walls 41 and 43 and through the flange 49 to insure the proper rigid spacing between the feed wheels 35 and 37.

A pair of shaft-mounting members 55 are secured to a frame or housing 57 by means of bolts or the like which are not shown but are well known in the art. A shaft 59 is rotatably journaled within the shaft-mounting members 55 such that it rotates freely therein. The outside disc-like side wall 39 of the first rotary feed wheel 35 includes an externally extending sleeve-like hub 61 for telescopically receiving and fixedly securing said shaft 59 therein such that said first and second feed wheels, 35 37 are supported on said shaft 59 and rotate therewith. A first circular drive plate 63 has a central aperture and is rigidly secured to said external sleeve-like hub 61 as by welding or the like for rotation therewith and is further secured to the disc-like outer side wall 39 of the first rotary feed wheel 35 by a plurality of spaced connecting pins 65 near the outer periphery thereof. A second parallel disc-like plate having a large central aperture is rigidly secured to the outside side wall 45 of the second feed wheel 37 by means of a plurality of rigidly secured connecting pins 69 about the outer periphery thereof. The distal periphery of the drive plates 63, 67 are provided with a plurality of spaced sprocket teeth 71, 73 which are adapted to be engaged by the links 29, 30 of the roller chains of the continuously moving conveyor 15 to rotate the shaft 59 and the feed wheels 35, 37 connected thereto such that the peripheral speed of the distal periphery of the wheels 35, 37 is perfectly synchronized to the linear speed of the continuously moving conveyor 15.

The feed or supply hopper 11 has vertically extending inlet-defining walls 75 and an angular or slanted bottom wall 77. The output of the hopper 11 is defined by a hollow cylindrical portion 79 which opens through the central aperture in the side plate 45 into the centrally hollow interior hub portion 21. The hopper 11 including the walls 75, the bottom 77 and the outlet 79 remain stationary while the wheel and hub assembly 35, 37, 47 rotate. As the cherries are supplied to the hopper 11 through the opening defined by the vertically extending walls 45, the cherries contact the slanted wall 77 and are directed through the cylindrical outlet 79 into the centrally hollow hub portion 21. As the feed wheel assembly 17 rotates, the cherries 13 are tumbled about in the interior hub portion 21 and a succession of the cherries 13 are directed into a plurality of the feed passages 25 which are then oriented downwardly. The succession of cherries will be displaced even further outwardly in the feed passages 25 toward the exit ports 23 by the combined effect of gravity and the centrifugal force generated by the rotation of the feed wheel assembly 17.

Figure 3:
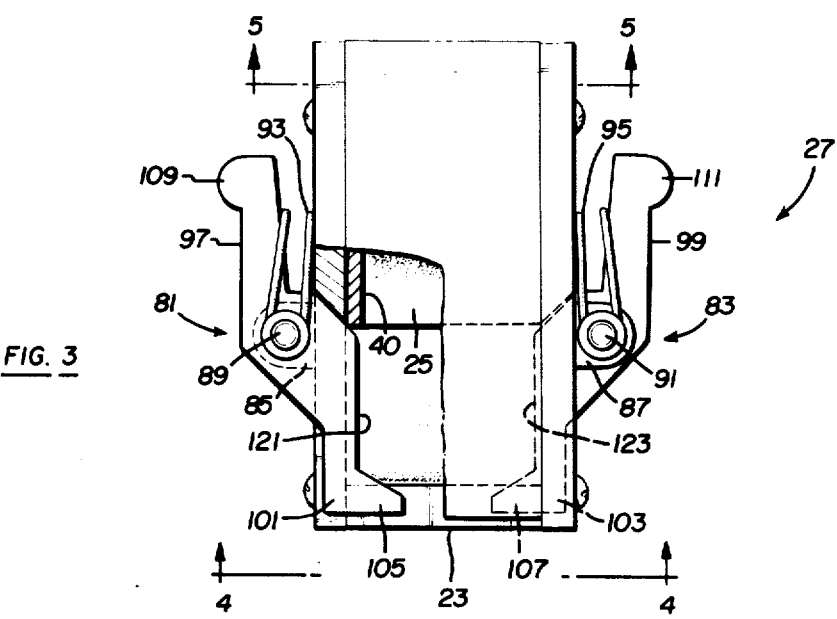
FIG. 3 is a view on an elongated scale of the gating mechanism at the end of the feed passage which is used to control the feeding of the cherries onto the moving conveyor.
Figure 4:
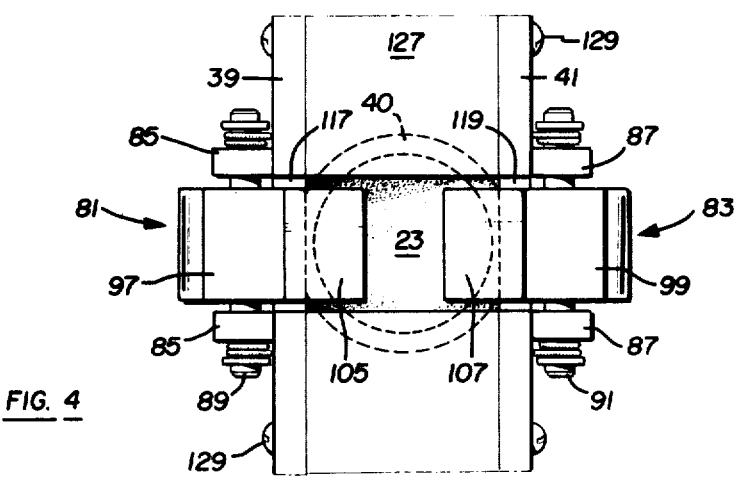
FIG. 4 is a view of the assembly of FIG. 3 looking in the direction of the view lines 4—4 of FIG. 3.

The outward or distal end cherry 13' in the succession of cherries 13 contained within the feed passages 25 is retained within the feed passage 25 proximate the exit port 23 thereof by a gating assembly 27 as shown in FIG. 2 and in even greater detail in FIGS. 3 and 4. Each of the gating assemblies 27 includes a pair of pivotal arms 81 and 83 which are pivotally mounted at ears 85, 87 extending away from the outside of the passage defining walls 39, 41. Pivot pins 89, 91 pivotally connect the pivot arms 81, 83 for pivotal rotation about the ears 85, 87. Spring members 93, 95 bear against the outer side walls 39 and 41 to bias the upper ends 97, 99 into a first position away from the side walls, 39, 41. The opposite ends 101, 103 include blocking elements or fingers 105, 107 which normally close the exit port 23 and block the passage of the end cherry 13' from exiting therethrough when said pivotal arms 81, 83 are biased into the first or normal position as shown in FIG. 3.

The ends 97, 99 of the pivot arms 81, 83 include outwardly extending cam surfaces 109, 111. A set of stationary cams 113, 115 are mounted to the housing 57 adjacent the outer periphery of the side walls 39, 41 such that the cam surfaces 109, 111 will operably contact the stationary cams 113, 115 as the next successive feed passage 25 to discharge a cherry 13' approaches a discharge position substantially vertically over the fruit-receiving cup 33. This contact will overcome the bias of the springs 93, 95 and move the pivot arms 81, 83 to a second position wherein the ends 97, 99 are cammed in against the side walls, 39, 41 to pivot the arms 81, 83 to open the blocking elements 105, 107 and permit the passage of the end cherry 13' through the exit port 23 to be deposited into the article-receiving cup 33. Since the feed wheel assembly 17 is driven in synchronization with the conveyor 15, the component of the velocity of the end cherry 13' in the direction of the motion of the conveyor 15 is exactly synchronized with the speed of the continuously moving conveyor 15 as the cherry is released, there is no relative motion between the fruit-supporting cup 33 and the expelled cherry 13', hence no hopping or jumping will occur.

As soon as the end cherry 13' in the succession of cherries currently with the feed passage 25 has been expelled through the exit port 23, the cam surface 109, 111 will pass off of the stationary cams 113, 115 and restore the pivot arms, 81, 83 to the normal position thereby repositioning the blocking elements 105, 107 across the exit port 23 to block the passage of any more of the succession of cherries therethrough. The succession of cherries currently within the feed passage 25 will be moved radially outward toward the blocking elements 105, 107 at the exit port 23 by the operation of the centrifugal force generated by the rotation of the feed wheel assembly 17. The next successive cherry 13" and the cherries 13 in the succession behind it will all be moved by the action of centrifugal radially outward until the cherry 13" has moved to the end position and become the next cherry 13' to be deposited on the next rotation of the feed wheel assembly 17.

FIGS. 3 and 4 show that the lower ends 101, 103 of the pivot arms 81, 83 extend through apertures 117, 119 into the feed passage 25. In addition to the blocking elements 105, 107 extending through the apertures 117, 119 a gripping portion 121, 123 of the lower portion 101, 103 of the pivot arms 81, 83 may also extend through the apertures 117, 119 and physically grip or releasably retain at least the end cherry 13'. This is an optional embodiment since it has been found that centrifugal force alone is normally sufficient to retain the end cherry 13' against the blocking members 105, 107 proximate the exit port 23.

Regardless of whether or not the end cherry 13' is positively gripped by the portions 121, 123 or whether the end cherry 13' is held proximate the exit port 23 by the operation of centrifugal force alone, or some combination of the two, at least the next successive cherry 13" will be retained at the outer end of the passage 25 proximate the end cherry 13' by the operation of centrifugal force. This insures that a second cherry 13" will always be ready to move forward when the previous cherry 13' is deposited on the conveyor 15 so that there is no wait for a cherry to tumble by gravity from the hollow central chamber 21 through the feed passages 25 to the exit port 23. In practice, more than one additional cherry is maintained in the passage 25 by centrifugal force as the feed wheel assembly 17 rotates.

Figure 5:
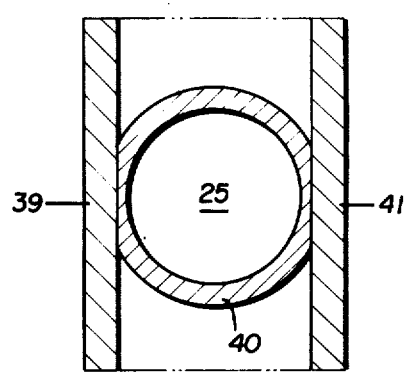
FIG. 5 is a sectional view taken along view lines 5–5 of FIG. 3.

As shown in FIG. 5, the walls of the feed passages 25 are generally circular. As shown in FIG. 4, a plurality of the short actuate segments 127 are mounted between the exit ports 23 of successively spaced tubular passages and extend circumferentially that the periphery of the feed wheels 35, 37 between successive exit ports 23. The acturate segments 127 may be mounted to the side walls 39, 41 and 43, 45 (the sides of the tubular passages 25) some means such as screws or bolts 129 or some similar means known in the art.

In operation, a plurality of individual articles 13 such as cherries or the like are fed into a supply hopper 11. The fall by gravity and contact the sloping wall 77 which directs the cherries 13 through the outlet 79 and into the centrally hollow hub portion 21 of the feed wheel assembly 17. The feed wheel assembly 17 is continuously rotating since it is periphery driven by the engagement of the peripheral sprocket teeth 71, 73 with the lengths 29, 30 of the chain conveyor 15. Since this is the only means driving the feed wheel assembly 17, the peripheral rotational speed of the feed wheel assembly 17 is precisely synchronized with the speed of the moving conveyor 15. As the cherries 13 enter the centrally hollow interior hub portion 21, they are inserted by gravity and then partly by centrifugal force into the lower feed passages 25. As the feed wheel assembly 17 rotates, the succession of cherries which were directed into the lower feed passages 25 are moved or displaced outwardly in the feed passages 25 toward the exit ports 23 at least partially by centrifugal force generated by the rotation of the feed wheel assembly 17. Since the gating assembly 27 normally positions the blocking elements 105, 107 across the exit port 23 to block the passage of the end cherry 13' therefrom, none of the succession of cherries 13 is able to exit the feed passage 25. The end cherry 13' in the succession of cherries 13 may be positively retained adjacent the exit port 23 by the side portions 121 and 123 of the pivot arms 81, 83 or, alternatively, may be retained at the end of the passage against the blocking elements 105, 107 and adjacent the exit port 23 by means of centrifugal force alone, or by a combination of centrifugal force and positive gripping. Regardless of how the end cherry 13' is held adjacent the exit port 23, at least the next cherry 13" in the succession and usually others in the succession are held toward the outer peripheral or radial end of the passage 25 and substantially proximate or adjacent to the end cherry 13' by means of centrifugal force generated by the rotation of the rotary feed wheel assembly 17.

As each of the feed passages 25 have been positioned by the rotation of the feed wheels 35, 37 such that their exit ports 23 are operatively positioned substantially vertically above a pair of fruit-supporting cups 33 of the conveyor 15 and when the component of the velocity of the end cherry 13' in the direction of the moving conveyor 15 is synchronized with the speed of the fruit-receiving cups 33 on the conveyor 15, the cam surfaces 109, 111 of the pivotal arms 81, 83 contact the stationary cams 113, 115 and open the blocking elements 105, 107 to allow the expulsion of the end cherry 13' through the exit ports 23 and into the fruit-receiving cups 33. Since the speed of the cherries 13' and the speed of the conveyor 15 have been synchronized, there is no relative motion between the two, and hence no tendency for the cherry to jump or hop out of the fruit-supporting cup or off of the conveyor 15. The cam surfaces 109, 111 immediately pass off of the stationary cams 113, 115 and the force of the biasing springs 93, 95 cause the pivot arms 81, 83 to pivot to the normal position thereby closing the blocking elements 105, 107 over the exit port 23 so as to prevent the passage of the next successive cherry 13" from passage 25. Centrifugal force will shift or displace the succession of cherries 13 outwardly in the passage 25 so as to position the next successive cherry 13" into the end position. This shift usually occurs simultaneously with a closing of the blocking elements 105, 107 so as to allow the gripping portions 121 and 123 of the pivot arms 81, 83 to positively retain the newly positioned end cherry 13', if desired. The newly positioned end cherry 13' and those immediately behind it in the succession are then held or retained outwardly in the passage 25 at least partially by centrifugal force as the feed wheel assembly 17 rotates 360° to deposit the newly positioned cherry 13'.

There are of course, a plurality of these feed passages 25 about the periphery of the feed wheel assembly 17 so that cherries 13 are successively positioned at spaced intervals on the conveyor 15. The spaced intervals are defined as the circumferentially measured distance between successively spaced exit ports 23. Since the speeds are synchronized and there is no waiting for the next successive cherry to be in a position for deposit, the rotary feed wheel assembly 17 of the present invention is able to operate at very high rates of speed, thereby enabling the conveyor 15 to operate at substantially higher speeds than were heretofore possible. This of course greatly improves the overall speed and efficiency of the pitting operation and the fact that the next successive articles are always immediately available for deposit insures that mis-feeds or no-feeds seldom, if ever, occur.

Although specific apparatus and materials have been recited in describing the prime embodiment of the present invention, it will be obvious to those skilled in the art that various modifications can be made without departing from the spirit and scope of the present invention which is limited only by the appended claims.

I claim:

1. In an apparatus for conveying pieces of drupaceous fruit in spaced fruit-supporting cups mounted on a continuously moving conveyor, an improved rotary feed assembly for separating a flow of fruit from a hopper into individual pieces and for synchronously depositing said individual pieces into said fruit-supporting cups, the assembly comprising:

a plurality of rotatable feed wheels each of which includes a centrally hollow hub portion communicating to said hopper, each successive feed wheel hub from said hopper having a reduced internal diameter as compared to that of an adjacent feed wheel nearer the hopper to distribute said fruit among said feed wheels, a plurality of circumferentially spaced fruit discharge ports formed about the periphery of each said feed wheel, and a corresponding plurality of individual, radially extending feed passages communicating between a passage entry thereinto in said hub portion and said spaced ports, each said passage holding for movement therethrough at least two pieces of said fruit, each said hub portion adapted to receive a plurality of said pieces of fruit, the fruit being sorted into said passages and moved outwardly in said passages from the entry and toward said exit ports, and an outermost one of the pieces being maintained adjacent the discharge port substantially throughout the rotation of its feed wheel at least partially be centrifugal force;

means for rotating said feed wheels to generate said centrifugal force and to synchronize the rotational velocity of the distal ends of said feed passages with the linear velocity of said moving conveyor;

the conveyor comprising a parallel pair of chains engaging said feed wheels and a plurality of plates carried on and between said chains and containing fruit receiving cups, each of said cups providing a space between said rotary feed wheels and said plates to allow said piece of fruit to be deposited thereinto; and gating means normally blocking the exit of said outermost one of said pieces from each of said discharge ports of said feed passages and responsive to said port being operably positioned with respect to one of said fruit-supporting cups for unblocking said port and depositing an individual piece into said cup without relative motion therebetween during said depositing.

2. The rotary feed assembly of claim 23 wherein each of said plurality of radially extending feed passages is a cylindrical passage having a cross sectional diameter slightly greater than the diameter of the largest piece of drupaceous fruit to be handled.

3. The rotary feed assembly of claim 1 wherein said gating means includes a pair of pivotal blocking elements mounted proximate the distal end of each of said passages, each one of said pair of pivotal blocking elements having a blocking finger at one end thereof adapted normally to be interposed within the distal end of said passage to block the exit of one of said fruit pieces from said exit port.

4. The rotary feed assembly of claim 3 wherein said gating means further includes stationary cams adjacent the sides of said feed wheels, said pair of pivotal blocking elements having cam-engaging members at the opposite end thereof and means for biasing said pair of pivotal blocking members to pivot so as normally to cause said blocking fingers to close said discharge port to the passage of one of said fruit pieces therefrom, said pair of blocking elements being opened responsive to said cam engaging elements contacting said stationary cams to open said exit port.

5. A rotary feed apparatus for synchronously feeding articles at spaced intervals onto a continuously moving conveyor comprising:
   a feed wheel having a centrally hollow hub portion and a plurality of spaced radially extending feed passages, each of said feed passages having one end communicating with said hub portion and a distal end terminating in an exit port, said exit ports being spaced such that the circumferentially measured distance between successive exit ports is equal to the linear length of said spaced interval;
   a hopper supplying a plurality of said articles into said hub portion;
   a housing rotatively supporting said feed wheel above said moving conveyor;
   drive means rotating said feed wheel to synchronize the rotational velocity of the distal ends of said feed passages with the linear velocity of said moving conveyor; and
   gating means normally closing said exit ports while said feed wheel is rotating and responsive to said exit port being operably positioned with respect to said moving conveyor for opening said exit port and depositing a single article onto said moving conveyor, and further including,
   stationary cam means mounted on said housing adjacent the sides of said feed wheel and offset from the vertical centerline thereof; and
   a pair of pivotal elements mounted proximate the peripheral end of each of said plurality of feed passages, said pair of pivotal elements including a pair of blocking elements at one end thereof adapted to close said exit port to prevent the passage of the article in the peripheral end of said passage therethrough when said pair of pivotal elements are in a first position and to open said exit port and permit the passage of the end article through said exit port when said pair of pivotal elements are in a second position, said gating means further including means normally biasing said pair of pivotal elements in said first position and cam elements on the other end of said pair of pivotal elements adapted to engage said stationary cams and pivot said pair of pivotal elements to said second position and open said pair of blocking elements to deposit said end article onto said moving conveyor when said exit port is operably positioned with respect to said moving conveyor, and further characterized in that each of said plurality of feed passages including a pair of spaced ear members on both sides of the distal end thereof, one of said pair of pivotal elements being pivotally received within the pair of spaced ear members on one side of said passage and the other said pair of pivotal elements being pivotally received within the spaced pair of ear members on the other side of said passage and a pivot pin passing through said ear members and through said pivotal elements for mounting same, said biasing means includes a pair of spring elements mounted proximate said pair of pivot pins, each of said springs contacting the walls of said passages and the cammed ends of said pair of pivotal elements for biasing the cammed ends away from said passage and said blocking elements in a closed position across said exit port.

6. Apparatus for receiving a continuous flow of drupaceous fruit from a supply thereof and separating said flow into individual pieces of fruit for continuous deposit onto a receiving conveyor, the apparatus comprising,
   a. an apparatus body,
   b. a feed hopper carried by said body and having a top inlet to receive said flow of fruit, an inclined side carried by said hopper below said inlet to divert said flow from a vertical path to a horizontal path, and a side outlet carried by said hopper opposite said inclined side to allow a discharge of said flow,
   c. a feed wheel assembly rotatively carried by said body and comprising,
      first and second vertically positioned, axially-spaced feed wheels, said second wheel having an inner opening joining with said hopper outlet, said opening having a first diameter and said first wheel having an inner opening having a second diameter which is less than said first diameter,
      a hollow cylinder member carried between said feed wheels and having an inner opening having a diameter proximating said second diameter and one endd thereof joining with said inner opening of said first feed wheel and an outwardly protruding annular flange carried by said member at an opposite end thereof, said flange joining with said inner opening of said second feed wheel, said inner openings of said feed wheels and said hollow member forming a hollow hub to receive said flow of fruit from said hopper,
      a plurality of radially extending, circular passages formed in said feed wheels, said passages being circumferentially spaced equidistantly about the first and second feed wheels and intersecting with said inner openings of said feed wheels to form fruit inlets and with outer peripheral surfaces of said feed wheels to form fruit outlets, each said passage having a longitudinal slot formed in each of an inner and an outer vertical surface of said feed wheel, and an outer end of said slot intersecting said outer peripheral surface of said wheel adjacent said outlet end of said passage,
d. gating means including,
   a pair of pivots each carried on each of the inner and outer vertical surfaces of each of said feed wheels adjacent an inner end of said slot in said circular passage,
   a pair of release elements each having a center portion rotatively carried by one of said pivots, a radially inner portion spaced from said vertical side and having a camming surface on a radially inner end thereof, and a radially outer portion disposed in said slot and having a blocking element on an outer end and protruding into said passage, and a biasing spring positioned about said pivot and biasing said inner portion of said element away from said vertical surface of said feed wheel,
e. a stationary cam means carried by said apparatus at a release point positioned below an axis of said feed wheels and aligning vertically with said feed wheels, said cam means engaging said cam surfaces of said release elements to selectively bias said outer ends of said release elements toward said vertical surfaces of said feed wheels, and
f. a drive and conveyor means comprising,
   a first and second vertical chain sprocket carried by said vertical surfaces of said first and second feed wheels and spaced axially therefrom, said sprockets having a diameter approximately the same as an outside diameter of each said feed wheel,
   a conveyor including a plurality of plates having fruit receiving cups, said cups selectively spaced apart by the circumferential distance between said passage outlets in said first and second feed wheels,
   a first and a second continuous chain pivotally carrying therebetween said offset plates, each of said chains engaging a bottom portion of each of said chain sprockets at said release point and driving said feed wheels at a selected velocity,
   wherein said flow of fruit is separated into individual pieces and deposited in said receiving cups of said conveyor plates as said fruit moves from said hopper, into said inner hub, and through each of said radially disposed passages as said cam surfaces of said gating elements are engaged by said stationary cam means and said blocking elements are rotated from said passage to deposit a piece of fruit into said cup positioned beneath.

* * * * *